(12) United States Patent
Martinsen

(10) Patent No.: US 9,878,654 B2
(45) Date of Patent: Jan. 30, 2018

(54) TIE DOWN BUNDLE SECURING DEVICE

(71) Applicant: Gregory Martinsen, Ashland, WI (US)

(72) Inventor: Gregory Martinsen, Ashland, WI (US)

( * ) Notice: Subject to any disclaimer, the term of this patent is extended or adjusted under 35 U.S.C. 154(b) by 273 days.

(21) Appl. No.: 14/856,272

(22) Filed: Sep. 16, 2015

(65) Prior Publication Data

US 2016/0318435 A1 Nov. 3, 2016

Related U.S. Application Data

(60) Provisional application No. 62/154,907, filed on Apr. 30, 2015.

(51) Int. Cl.
*B60P 7/06* (2006.01)
*B60P 7/08* (2006.01)

(52) U.S. Cl.
CPC .................. *B60P 7/0846* (2013.01)

(58) Field of Classification Search
CPC ....... B60P 7/0823; B60P 7/083; B60P 7/0838; B60P 7/0846; B60P 7/0853; B65B 13/025; B65B 13/027; F16G 11/12; Y10T 21/2147; Y10T 24/21
USPC ................... 242/395, 588, 915, 916; 24/71.1
See application file for complete search history.

(56) References Cited

U.S. PATENT DOCUMENTS

| 905,171 | A | 12/1908 | Gilcrest |
|---|---|---|---|
| 3,805,334 | A | 4/1974 | Graup |
| 4,155,537 | A | 5/1979 | Bronson et al. |
| 4,954,030 | A * | 9/1990 | Szucs ..................... B60P 7/0823 224/318 |
| 5,279,432 | A | 1/1994 | Pryor |
| 5,611,520 | A | 3/1997 | Soderstrom |
| 6,102,371 | A | 8/2000 | Wyers |
| 6,654,987 | B1 | 12/2003 | Wu |
| 8,141,852 | B1 | 3/2012 | Gresham |
| 2002/0030133 | A1 | 3/2002 | Ratzlaff |
| 2006/0037178 | A1 | 2/2006 | Sulhoff |
| 2012/0241545 | A1 | 9/2012 | Borntrager |

* cited by examiner

*Primary Examiner* — Jack W Lavinder
(74) *Attorney, Agent, or Firm* — Christensen, Fonder, Dardi & Herbert PLLC

(57) ABSTRACT

A tie down bundle securement device for attaching a looped bundle of tie down strap to a tensioned tie down strap. The device may include a first support member for placement below the tensioned tie down strap extending from a first frame portion in a first direction. The device may include a second support member for placement on the looped bundle extending in the first direction intermediate the ends of the first frame portion. The first and second support members may define an opening to receive the looped bundle and the tensioned tie down strap. The device may include a third support member, for placement below the tensioned tie down strap, adjustably positioned opposite the first support member. The device is rotatable to compress the second support member into the looped bundle and the third support member is adjustable to secure the looped bundle to the tensioned tie down strap.

20 Claims, 14 Drawing Sheets

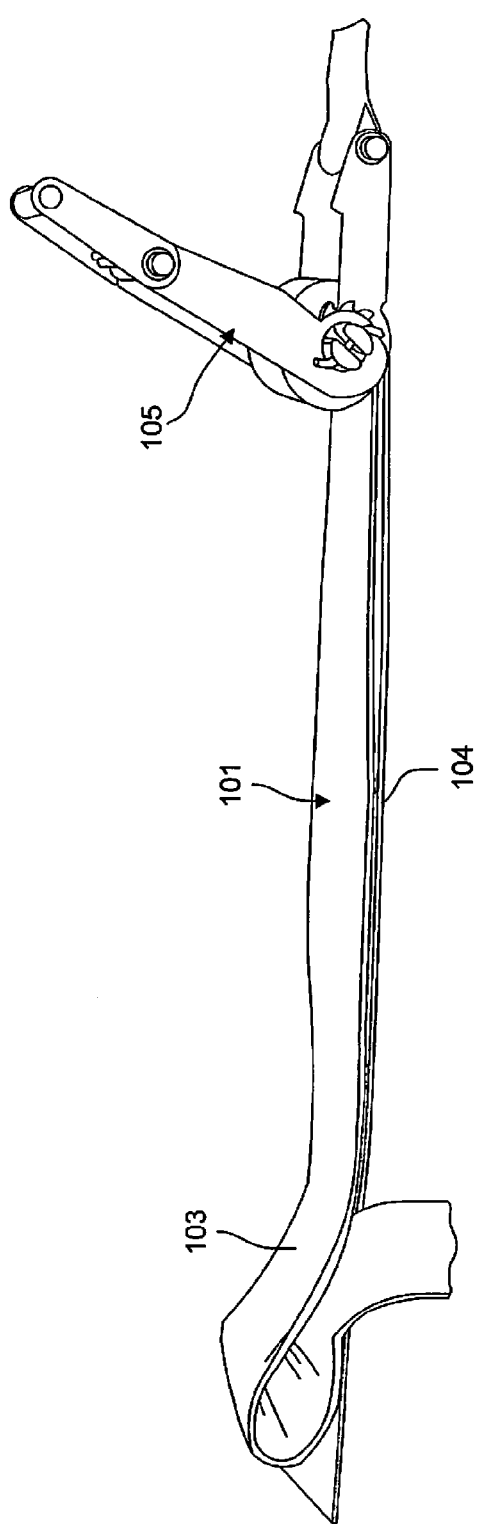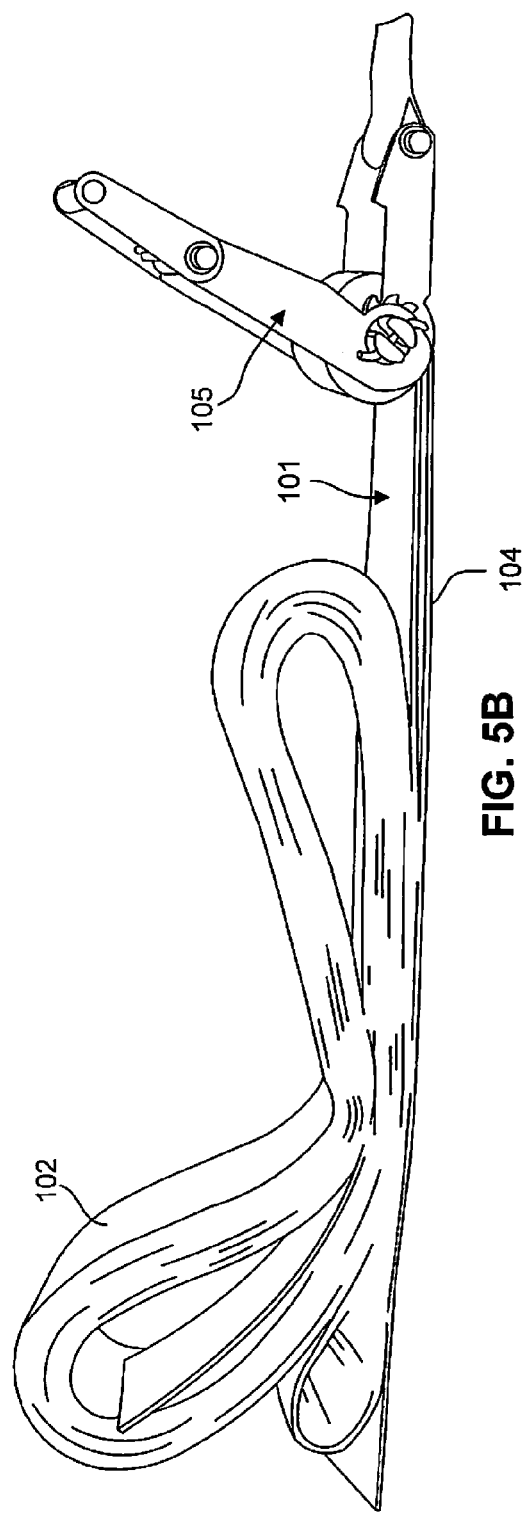
FIG. 5A
FIG. 5B

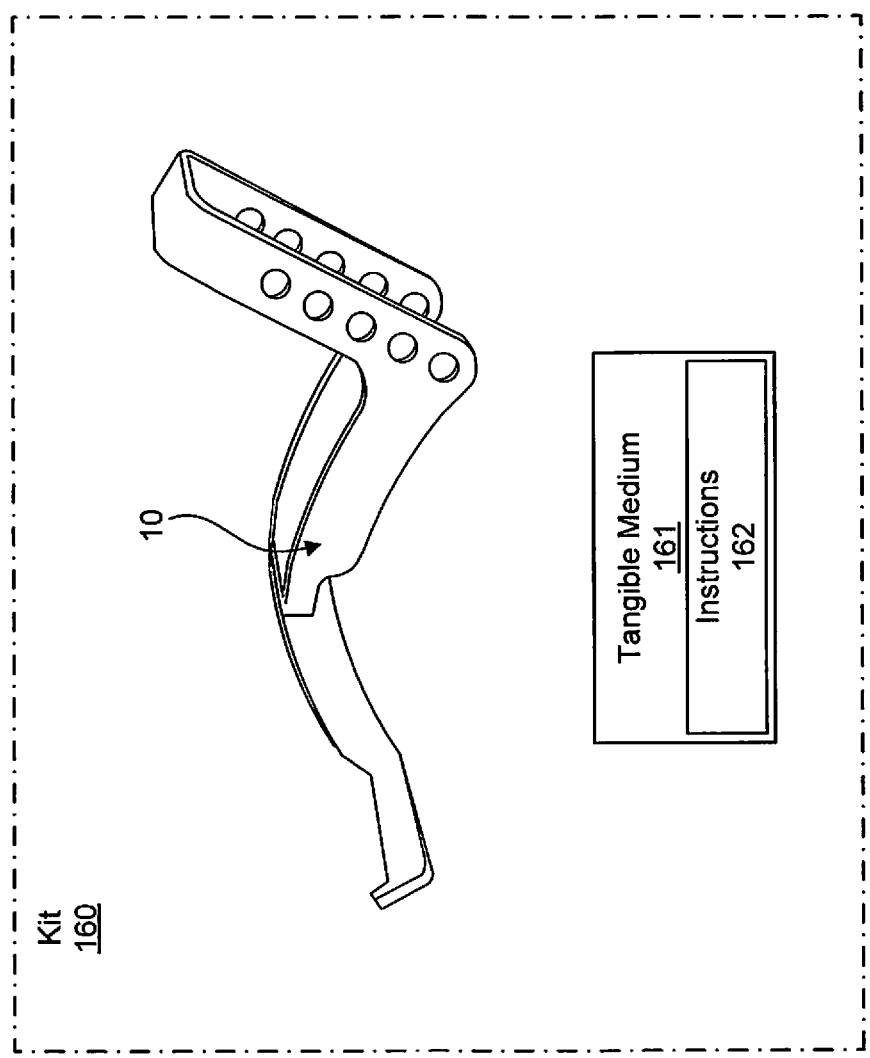

TIE DOWN BUNDLE SECURING DEVICE

RELATED APPLICATIONS

The present application claims the benefit of U.S. Provisional Application No. 62/154,907, filed Apr. 30, 2015, the disclosure of which is hereby incorporated by reference herein in its entirety.

BACKGROUND

The present disclosure relates to ratchet tie down devices, and more specifically, to a tie down bundle securement device to secure a looped bundle of tie down strap to a base.

Ratchet tie down devices are well known to secure various types of cargo onto a trailer or other support surface for storage or transportation. Ratchet tie down devices typically have a ratchet mechanism with a fixed length line with a hook piece attached to one side of the mechanism and an adjustable strap that is attached to a windable spool with a slot that is part of the ratchet mechanism. The adjustable strap has a hook end and a free end. The adjustable strap may be roughly adjusted by sliding the free end of the strap through the slot in the spool when the hook end is loosely attached to an appropriate portion of the cargo or carrier platform. The ratchet mechanism is then rotated to wind up the two layered strap thereby taking up the slack and tightening the tie-down. Generally the free end of the adjustable line will not be totally wound up into the spool, this is, it will be loose and there may be a very substantial length remaining. This may cause issues during transportation, as the excess cord or strap may become caught or tangled, which may damage the strap and/or may damage the cargo and/or create a personal hazard. Known methods for securing the excess strap include wrapping the loose end around the tightened strap. This is tedious and necessitates a time consuming unwrapping. Further, to the extent the loose end is bundled, it may come loose causing potential harm. Other methods of securing the excess strap have also been less than ideal. A more secure and orderly method of securing substantial lengths of excess strap would be appreciated.

SUMMARY

Aspects of the invention are directed towards a tie down bundle securement device for attaching a looped bundle of tie down strap to a tensioned tie down strap. The bundle securement device may include first, second, and third support members extending normally from an elongated frame portion in a first direction. The first support member for placement below the tensioned tie down strap, the second support member for placement on the looped bundle, and the third support member for placement below the tensioned tie down strap. The first support member may be positioned at a first end portion of the frame portion, the third support member may be positioned at a second end portion of the frame portion, and the second support member may be positioned intermediate the first and second end portions. First and second support members define an opening to receive the looped bundle and the tensioned tie down strap. When the looped bundle and the tensioned tie down strap are received in the opening, the device is rotatable about the first support member to compress the second support member into the looped bundle. Additionally, the third support member is adjustable below the tensioned tie down strap while the second support member is compressing the looped bundle to secure the looped bundle to the tensioned tie down strap.

Embodiments of the invention provides benefits in the form of a relatively simple device and process for securing excess strap or other tie down strap. For example, the tie down bundle securement device includes limited or no moving parts. In some embodiments, by limiting the number of moving parts, the tie down bundle securement device may realize improved durability and longevity relative to more complex designs. Additionally, the device is reusable and provides benefits in that it can be relatively quickly attached and removed. For example, the tie down bundle securement device can be attached by receiving a looped bundle of tie down strap and a tensioned tie down strap in the opening, rotating the device to engage the first and second support members with the looped bundle and adjusting the third support member by inserting a pin through apertures in the frame members to secure the tie down strap in place. The tie down bundle securement device may be removed by removing the pin and pulling the tie down bundle securement device or the looped bundle from the opening. Pushing the handle toward the tensioned strap can disengage the third support member from the tensioned strap and facilitate removal of the third support member.

Accordingly, in one or more embodiments, a tie down bundle securement device may include a first support member extending normally from a first end portion of an elongated first frame portion and extending in a first direction. The tie down bundle securement device may include a second support member intermediate the first support member and a second end portion of the first frame portion. The second support member may extend normally from the first frame portion in the first direction. The first frame portion and the first and second support members may define an opening, intermediate the first and second support members, to receive the looped bundle and the tensioned tie down strap. A third support member may be adjustably positioned on the first frame portion at the second end portion. When the looped bundle and the tensioned tie down strap are received in the opening, the device is rotatable about the first support member to compress the second support member into the looped bundle, and the third support member is adjustable below the tensioned tie down strap while the second support member is compressing the looped bundle to secure the looped bundle to the tensioned tie down strap. In some embodiments, the tie down bundle securement device includes a handle portion included in the first frame portion, the handle portion displaced from the first support member; and positioned such that the second support member is intermediate the handle portion and the first support member.

A feature and advantage of the invention is that the otherwise loose strap may be orderly and securely attached to an outwardly facing side of the tensioned strap. Such a location is easy to access and is typically available. A feature and advantage of the invention is that the adjustability of the third support member allows the user to adjust a level of securement of the device to the bundled strap and tensioned strap. Where the attachment is exposed on a trailer that will be transported for example, a tighter more secure placement of the device may be used.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5A-5G depicts a series of views of various steps in a method of securing a bundle of tie down strap using a tie down bundle securement device, according to one or more embodiments of the disclosure.

FIG. 9 depicts a kit including a tie down bundle securement device and a set of instructions included on a tangible medium, according to one or more embodiments of the disclosure.

Figure 1:
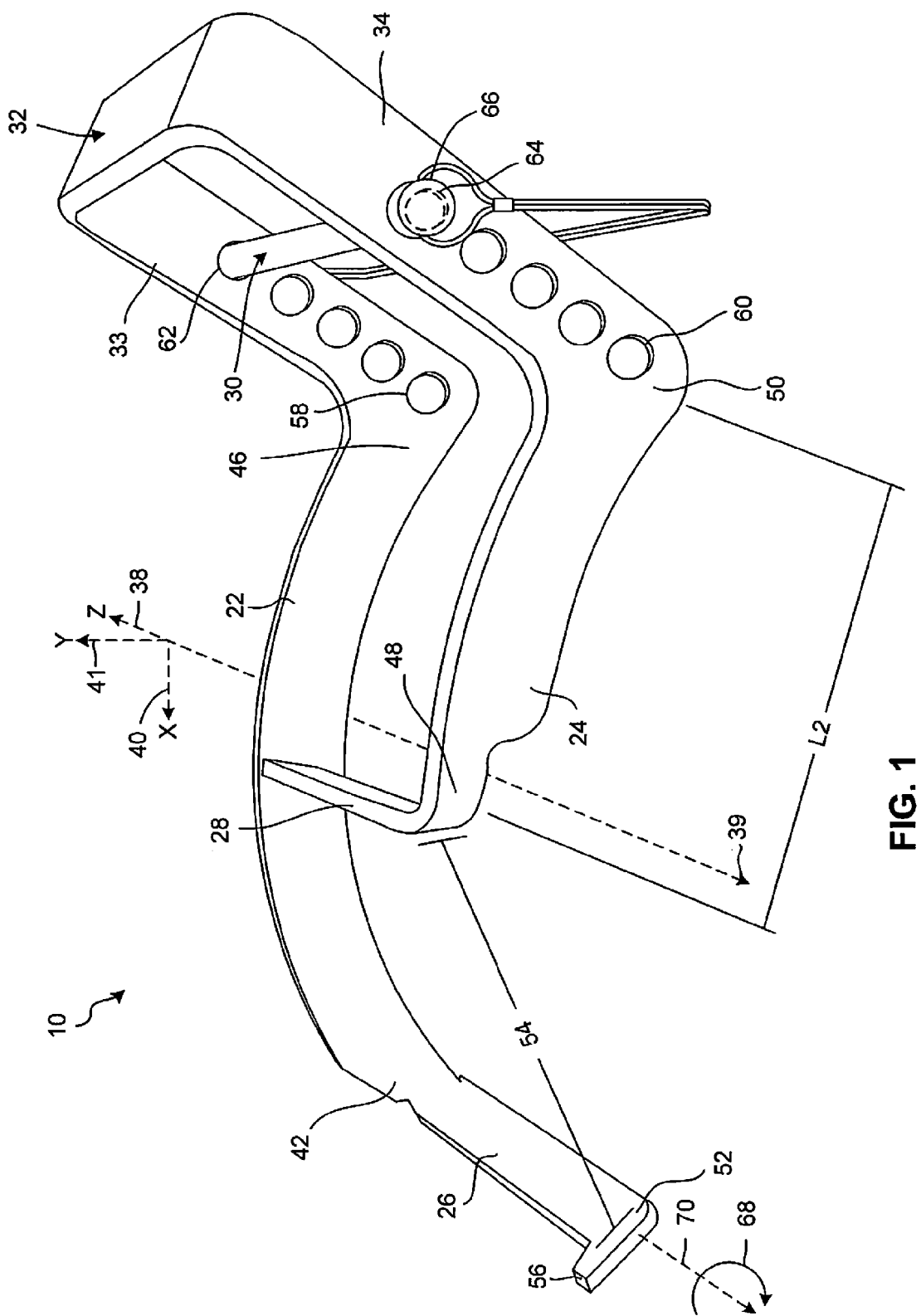
FIG. 1 depicts a perspective view of a tie down bundle securement device, according to one or more embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 2:
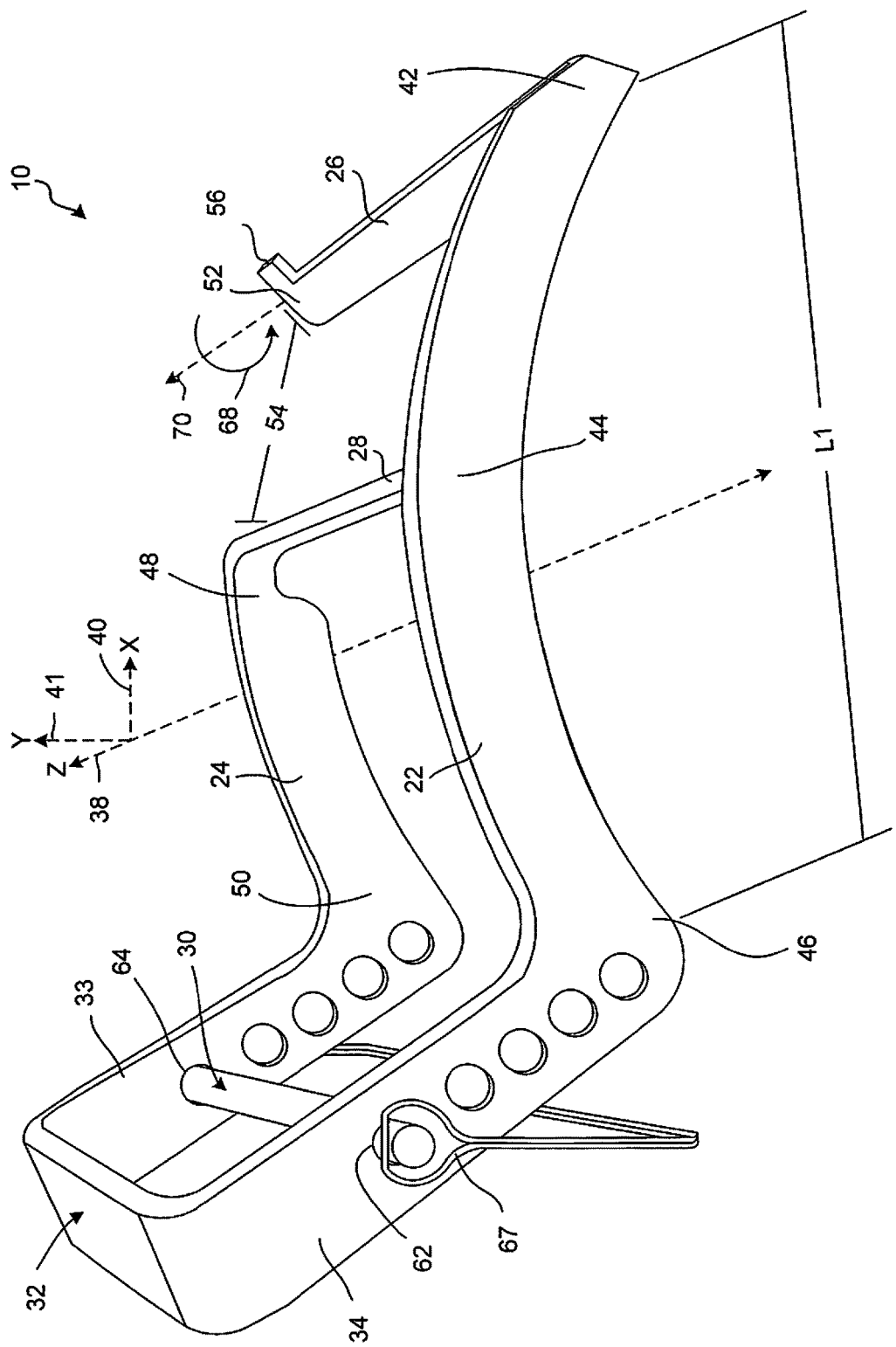
FIG. 2 depicts a perspective view of a tie down bundle securement device, according to one or more embodiments of the disclosure.

Referring to FIGS. 1 and 2, a tie down bundle securement device 10 is depicted, according to one or more embodiments of the disclosure. The tie down bundle securement device 10 may include a first frame portion 22, a second frame portion 24, a first support member 26, a second support member 28, a third support member 30, and a handle portion 32.

In one or more embodiments, the first frame portion 22 and the second frame portion 24 are elongated pieces of material. The first and second frame portions members 22, 24 may be positioned substantially parallel, lengthwise with one another. Depicted in FIGS. 1 and 2, the first and second frame portions 22, 24 are each substantially flat pieces of elongated material oriented such that the flat faces of the first and second frame portions 22, 24 are substantially parallel with each other. In some embodiments, the shape of the first and second frame portions 22, 24 varies. For example, the first and second frame portions 22, 24 may each be a rounded bar, or have other suitable elongated shape.

Depicted in FIGS. 1 and 2, the first and second frame portions 22, 24 are arced or curved about an axis 38 (Z axis) normal to the first and second frame portions 22, 24. In some embodiments, the first and second frame portions may be substantially straight, or have other shape. In one or more embodiments, the second frame portion 24 has a length L2, along an axis 40 (X axis), less than a length L1 of the first frame portion 22 along the axis 40. In some embodiments, as seen in FIGS. 1 and 2, the second frame portion 24 has a length L2 that is about half long as the length L1 of the first frame portion 22. The first and second frame portions 22, 24 may be positioned relative to one another such that a first end portion 48 of the second frame portion 24 comes to about a midpoint 44 of the second frame portion 24. Additionally, the first and second frame portions 22, 24 may be positioned such that a second end portion 46 of the first frame portion 22 and a second end portion 50 of the second frame portion 24 are approximately aligned. As used herein, the end portions 42, 46, 48, and 50 are portions of the first frame portion 22 and second frame portion 24 at and/or near the ends of the respective frame portions.

In one or more embodiments, first support member 26 is a transverse strap engagement bar, configured as an elongated piece of material, extended normally from a first end portion 42 of the first frame portion 22 and extended in a first direction, indicated by arrow 39 on the axis 38. Described further herein, the first support member 26 is a rigid member that cooperates with the second support member 28 for compression of a looped bundle of tie down strap with a tensioned section of tie down strap. In some embodiments, the first support member 26 extends in the first direction a distance such that an end portion 52, distal to the second frame portion 24, is substantially aligned with the second frame portion 24. In one or more embodiments, the first support member 26 is normal to the second frame portion 24. In some embodiments, the first support member 26 is a substantially flat piece of material oriented such that the flat face of the first frame portion 22 is oriented normal to the flat face of the first support member 26. The shape of the first support member 26 varies in one or more embodiments.

In some embodiments, the first support member 26 includes a lip 56. The lip 56 may be a portion of material extending from the first support member 26 outwardly, relative to the axis 38. In one or more embodiments, the lip 56 is positioned at the end portion 52 of the second support 28.

In one or more embodiments, the second support member 28 is a transverse strap engagement bar configured as an elongated piece of material extended, in the first direction from the midpoint 44 of the first frame portion 22 to connect to the first end portion 48 of the second frame portion 24. Described further herein, the second support member 28 is a rigid member that cooperates with the first support member 26 for compression of the looped bundle of tie down strap with the tensioned section of tie down strap. In one or more embodiments, the second support member 28 is normal to the first and second frame portions 22, 24. In some embodiments, the second support member 28 is a substantially flat piece of material oriented such that the flat faces of the first and second frame portions 22, 24 are oriented normal to the flat face of the first support member 28. In some embodiments, the shape of the first support member 28 may vary. For example, the first support member 28 may be a rounded bar, or have other suitable elongated shape. For example, the first support member 26 may be a rounded bar, or have other suitable elongated shape. As seen in FIGS. 1 and 2, the first support member 26, the first frame portion 22, and the second support member 28 define a C-shaped opening 54 facing the first direction.

In one or more embodiments, the tie down bundle securement device 10 includes a third frame portion 33 and a fourth frame portion 34. Third and fourth frame portions 33, 34 are extensions of the first and second frame portions 22, 24, respectively. For example, the third frame portion 33 is connected to the second end portion 46 of the first frame portion 22 and the fourth frame portion 34 is connected to the second end portion 50 of the second frame portion 24.

Seen in FIGS. 1 and 2, the third and fourth frame portions 33, 34 are each substantially flat and straight pieces of material oriented such that the flat faces of the third and fourth frame portions 33, 34 are substantially parallel with each other. In one or more embodiments the shape of the third and fourth frame portions 33, 34, varies. For example, the third and fourth frame portions 33, 34 may be a rounded bar, or have other suitable elongated shape. Depicted in FIGS. 1 and 2, the third and fourth frame portions 33, 34 extend outwardly, relative to the axis 38. In some embodiments, the third and fourth frame portions 33, 34 are angled approximately aligned with the axis 38 such that the third and fourth frame portions 33, 34 are generally pointed towards the axis 38.

In one or more embodiments, the third and fourth frame portions 33, 34 are members for supporting the handle portion 32. The handle portion 32, is an elongated piece of material connecting the third frame portion 33 and the fourth frame portion 34. In one or more embodiments, the handle portion 32 is normal to the third and fourth frame portions 33, 34. In some embodiments, the handle portion 32 is a substantially flat piece of material oriented such that the flat face of the handle portion 32 is normal to the flat face of the third and fourth frame portions 33, 34. The shape of the handle portion 32 varies in one or more embodiments. For example, the handle portion 32 may be a rounded bar, or have other suitable elongated shape.

In some embodiments, the handle portion 32 may provide structural support for the tie down bundle securement device 10 by connecting the third and fourth frame portions 33, 34. Additionally, in some embodiments, the handle portion 32 is further used to secure the looped bundle of tie down strap to the tensioned tie down strap by compressing the looped bundle of tie down strap to the tensioned tie down strap.

In one or more embodiments, the third support member 30 is a transverse strap engagement bar, configured as an elongated pin with a head 66 at one end. Described further herein, the third support member 30 is an adjustable member in the tie down bundle securement device for securing the tie down bundle securement device in place when compressing the looped bundle of tie down strap and the tensioned tie down strap. For example, the third support member 30 has a diameter less than the diameters of a first and second plurality of apertures 58, 60, for insertion through the tie down bundle securement device 10. The first and second plurality of apertures 58, 60 may be approximately aligned with one another for insertion of the third support member 30. For example, first and second apertures 58, 60 may be aligned in pairs such that the third support member 30 may be received through the third frame portion 33 and the fourth frame portion 34. The head 66 may have a diameter greater than the first and second apertures 58, 60. Accordingly, third support member 30, may be inserted through the third and fourth frame portions 33, 34, using the apertures and up to the head 66, which catches against the third or fourth frame portion 33, 34. In various embodiments, the third support member 30 has a corresponding clip or latch 67 for securing the third support member 30 in place when inserted through the third and fourth frame portions 33, 34.

In operation, the tie down bundle securement device 10 device may secure an elongated looped bundle of tie down strap positioned along a tensioned tie down strap. In some embodiments, the tie down strap may include cord, bungees, or other line suitable for securing a load or cargo. For example, the tie down strap may be a towing strap used with a ratchet to secure a load onto a trailer. In some embodiments, the tensioned tie down strap and the looped bundle of tie down strap are from the same continuous length of tie down strap. For example, the tensioned tie down strap may be a relatively taught used portion of a towing strap between a secured load and a ratchet or other tie down tensioning device, the looped bundle of tie down strap may be a collection of excess of the strap which is left unused from the ratchet.

In one or more embodiments, the tie down bundle securement device 10 receives the elongated looped bundle of tie down strap positioned lengthwise on the tensioned tie down strap, in the opening 54. When the looped bundle and the tensioned tie down strap are received in the opening 54, the first support member 26 contacts the bottom of the tensioned tie down strap and the second support member 28 contacts the top of the looped bundle of tie down strap. Accordingly, the first support 26 and the second support 28 are positioned on either side of the looped bundle and tensioned tie down strap. To secure the looped bundle of tie down strap, the handle portion 32 may be used to rotate the tie down bundle securement device 10 in a direction 68 about an axis 70 set in the first support member 26. As such, the first and second support members 26, 28, compresses the looped bundle to the relatively rigid tensioned tie down strap.

When the first and second support members are compressing the looped bundle and the tensioned tie down strap, the third support member 30 may be adjustably positioned using the plurality of apertures 58, 60, to contact the bottom of the tensioned tie down strap. For example, the tie down bundle securement device 10 is rotated in direction 68 compressing the looped bundle and the tensioned tie down strap and placing one or more of the plurality of apertures 58, 60 in alignment with the first support member 26. The third support member 30 may then be inserted through a pair of the plurality of apertures 58, 60 which are in alignment with the first support member 26, securing the tie down bundle securement device 10 in position compressing the looped bundle and the tensioned tie down strap.

In one or more embodiments, the arc of first and second frame portions 22, 24, and the position of the first support member 26 and the second support member 28 defines a distance between the first and second support 26, 28 in both the axis 40 and axis 41 (Y axis). In some embodiments, this distance between the first and second support members 26, 28, allows for the opening 54 to accommodate various looped bundles of tie down strap having different thicknesses. Additionally, in some embodiments, the amount of rotation about axis 70 to compress the looped bundle of tie down strap to the tensioned tie down strap is based on the thickness of the looped bundle of tie down strap. For example, the thicker the looped bundle of tie down strap, the less rotation about the axis 70 may be needed to compress the looped bundle to the tensioned tie down strap. In some instances, the thinner the looped bundle, the greater the rotation about axis 70 may be needed to compress the looped bundle.

In one or more embodiments, the plurality of apertures 58, 60, allow for looped bundles of various sizes to be accommodated by the tie down bundle securement device 10. For example, the thicker the looped bundle, the less rotation about the axis 70 is possible. Accordingly an aperture nearer to the second end portions, 46, 50 of the first and second frame portions 22, 24 may be better suited to secure the tie down bundle securement device 10. In some instances, the thinner the looped bundle the greater possible rotation about the second axis is possible. Accordingly, in order to sufficiently compress the looped bundle, the tie down bundle securement device 10 may have to be rotated until an aperture further from the second ends 46, 50, such as the first and second apertures 62, 64, are aligned with the first support member 26.

In one or more embodiments, the third and fourth frame portions 33, 34, allow the plurality of apertures to be separated from the first support member 26, a relatively constant distance for each aperture, as the tie down bundle securement device 10 is rotated. For example, as the tie-down 10 is rotated, the third and fourth frame portions 33, 34 are angled such that as each aperture aligns with the first support member 26 a distance approximately the same as distance L2.

In one or more embodiments, tie down bundle securement device 10 and the corresponding components, are made from a solid, rigid material such as metal, plastic, or other suitable rigid material for securing the looped bundle to the tensioned tie down strap.

Figure 3:
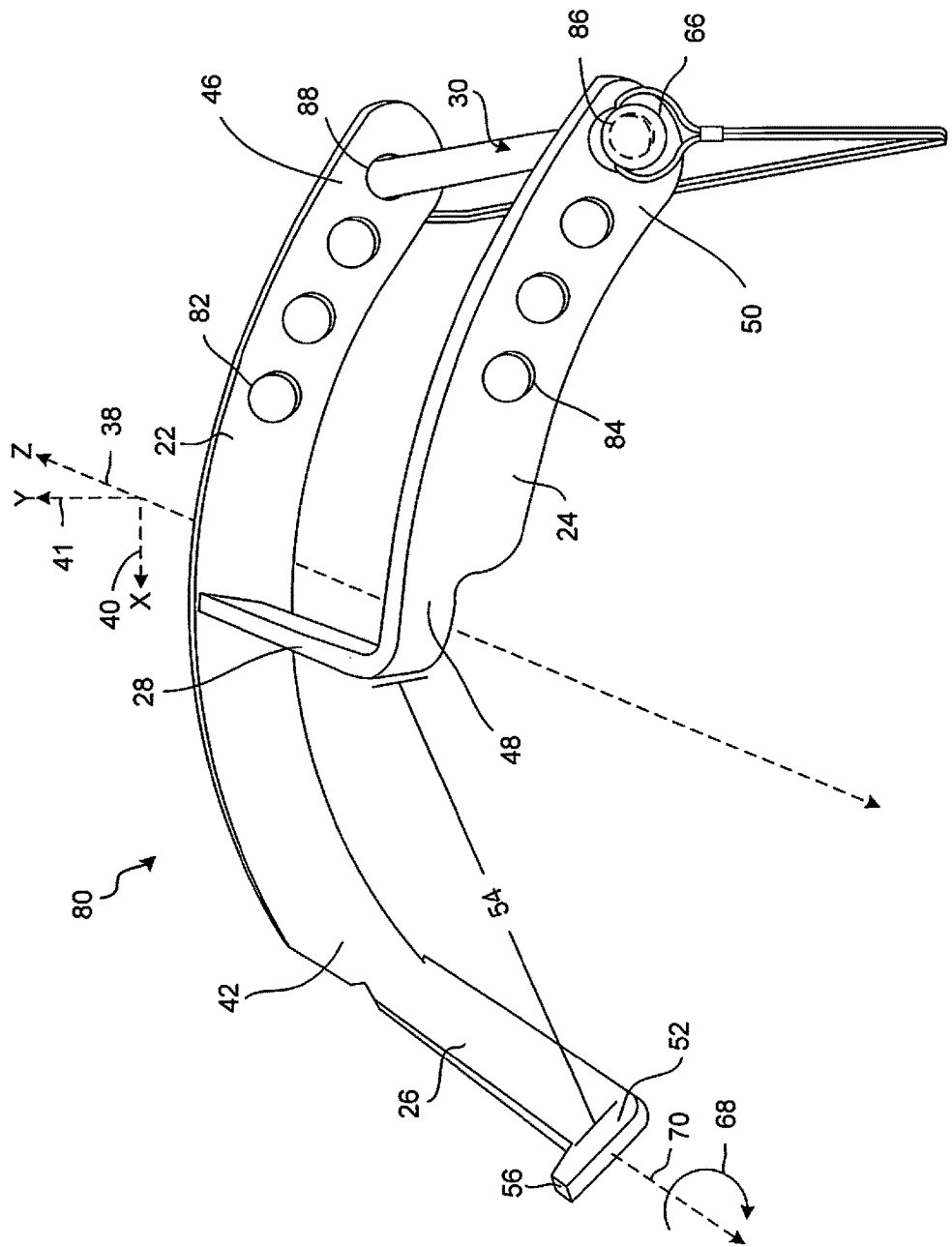
FIG. 3 depicts a perspective view of a tie down bundle securement device, according to one or more embodiments of the disclosure.

Referring to FIG. 3, a tie down bundle securement device 80 is depicted, according to certain embodiments of the disclosure. In some embodiments, elements of the tie down bundle securement device 80 sharing reference numbers with tie down bundle securement device 10 may be the same or substantially similar elements. For example, the tie down bundle securement device 80 may include a first and second frame portion 22, 24, a first support member 26, a second support member 28, and a third support member 30.

In certain embodiments, the first frame portion 22 and the second frame portion 24 each include a plurality of apertures 82, 84. For example, seen in FIG. 3, the first frame portion 22 includes a first aperture 86 of a plurality of apertures 82 and the fourth frame portion 32 includes a second aperture 88 of the plurality of apertures 84. The each of the plurality of apertures 82, 84 may be approximately aligned with one another. For example, first and second apertures 86, 88 may be aligned such that the third support member 30 may be received through the first frame portion 22 and the second frame portion 24.

In operation, the tie down bundle securement device 80 device may secure an elongated looped bundle of tie down strap positioned lengthwise along a tensioned tie down strap. The tie down bundle securement device 80 may operate in the same or substantially similar manner as the tie down bundle securement device 10 (FIG. 1). For example, the first support member 26, the second support member 28, and the third support member 30 may be used to compress the looped bundle of tie down strap to the tensioned tie down strap. For example, the tie down bundle securement device 80 may receive the looped bundle of tie down strap and the tensioned tie down strap in the opening 54. To secure the looped bundle of tie down strap, the tie down bundle securement device 80 may be rotated in a direction 68 about an axis 70 set in the first support member 26 which compresses the looped bundle to the relatively rigid tensioned tie down strap. The third support member 30 may then be inserted through apertures, such as 86, 88, which are in alignment with the first support member 26, securing the tie down bundle securement device 80 in position and compressing the looped bundle and the tensioned tie down strap.

Figure 4:
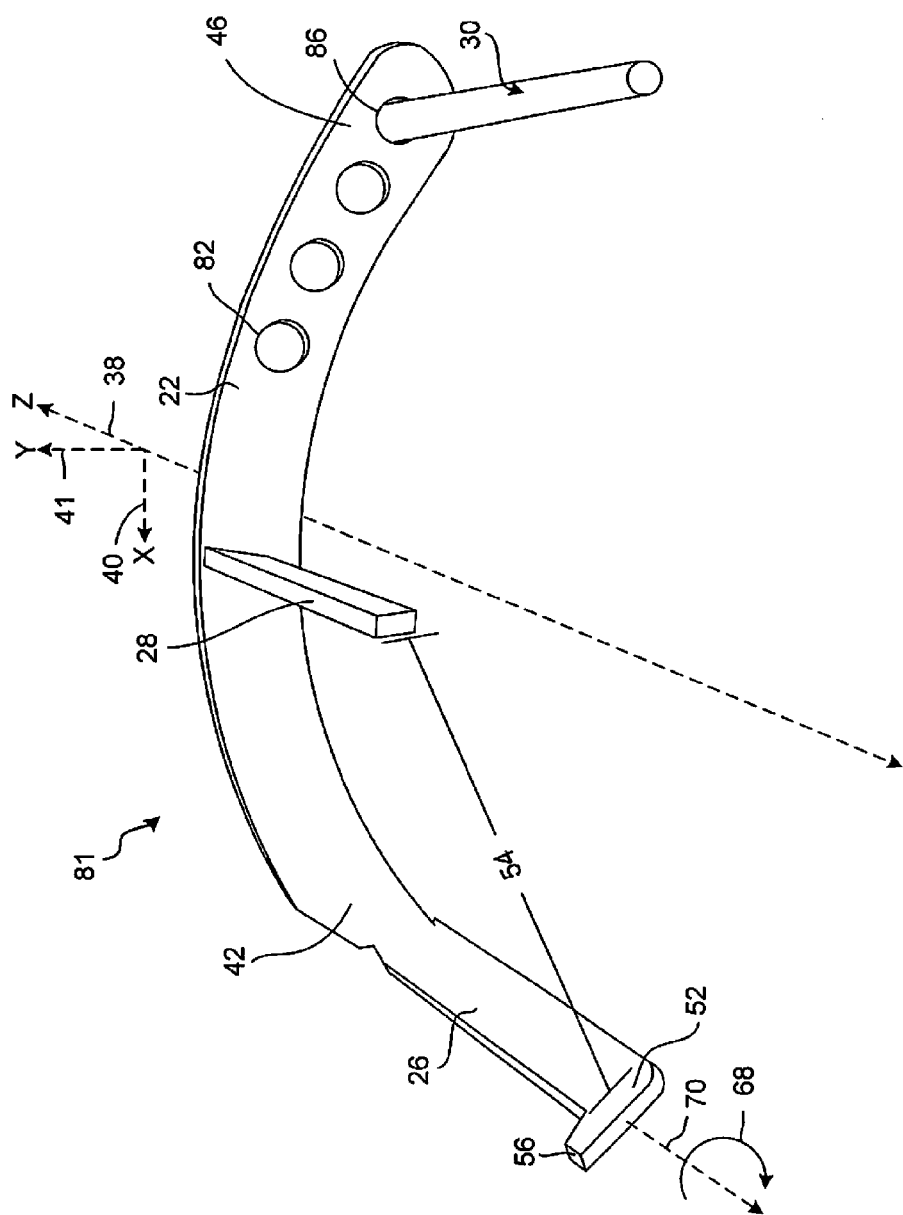
FIG. 4 depicts a perspective view of a tie down bundle securement device, according to one or more embodiments of the disclosure.

Referring to FIG. 4, a tie down bundle securement device 81 is depicted, according to certain embodiments of the disclosure. In some embodiments, elements of the tie down bundle securement device 81 sharing reference numbers with tie down bundle securement device 10, 80 may be the same or substantially similar elements. For example, the tie down bundle securement device 81 may include a first frame portion 22, a first support member 26, a second support member 28, and a third support member 30. In embodiments, the tie down bundle securement device 81 includes a first frame portion 22 having a thickness such that it may structurally support the first, second, and third support members 26, 28, 30 without the second frame portion 24 (FIG. 3). In operation, the tie down bundle securement device 81 device may secure an elongated looped bundle of tie down strap positioned lengthwise along a tensioned tie down strap. The tie down bundle securement device 81 may operate in the same or substantially similar manner as the tie down bundle securement device 80 (FIG. 3).

Referring to FIG. 5A-5G, a series of views of steps in a method of securing a looped bundle of tie down strap using a tie down bundle securement device is depicted, according to one or more embodiments of the disclosure.

Seen in FIG. 5A, a tie down strap 101 of strap is shown threaded through ratchet 105, and having a relatively loose portion 103 and a relatively taught tensioned portion 104 extending outwardly from the ratchet 105. In FIG. 5B, the loose portion 103 has been collected wrapped end over end to form a looped bundle 102 of which is placed on the tensioned portion 104 of the tie down strap 101.

Figure 5C:
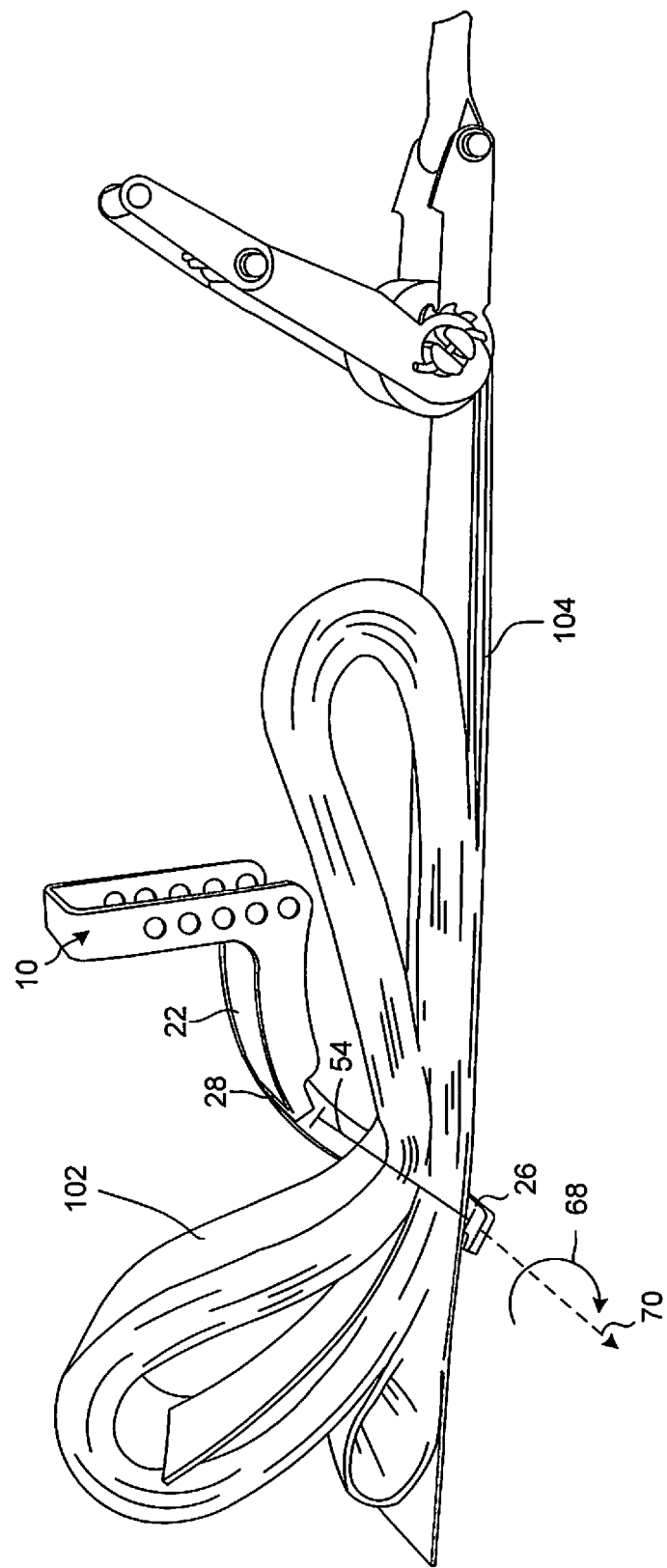

Seen in FIG. 5C, the tie down bundle securement device 10 is depicted with the looped bundle 102 of tie down strap 102. In certain embodiments, the tie down bundle securement device 10 is the same or substantially similar to tie down bundle securement device 10 (FIG. 1). The looped bundle 102 and the tensioned tie down strap 104 are positioned received in the opening 54, defined by first support member 26, the second support member 28, and the first frame portion 22.

The tie down bundle securement device 10 may be rotated, about the axis 70 along the first support member 26, to engage the tensioned tie down strap 104 using the second support 28 and to compressing the looped bundle 102 to the tensioned tie down strap 104 using the first and second support members 26, 28.

Figure 5D:
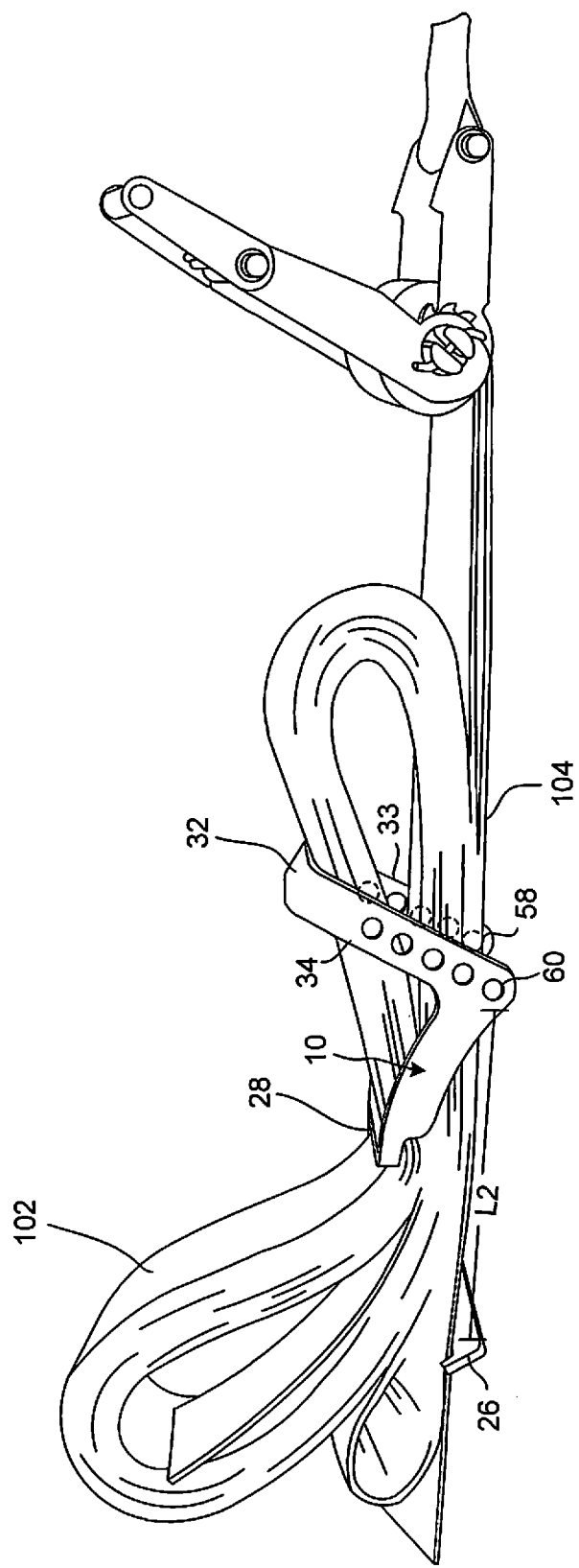

Referring to FIG. 5D, the tie down bundle securement device 10 is depicted subsequent to rotation about axis 70. The second support 28 is engaged with the tensioned tie down strap 104, and the first support 26 is engaged with the looped bundle 102, compressing the looped bundle 102 to the tensioned tie down strap 104. Additionally, handle portion 32 is engaged with looped bundle 102 for additional securing to the tensioned tie down strap 104.

As seen in FIG. 5D, subsequent to rotation, a pair of apertures from the plurality of apertures 58, 60 are positioned aligned with the second support 28. As described herein, the third frame portion 30 and the fourth frame portion 32 are angled such that as the tie down bundle securement device 10 is rotated each of the plurality of apertures 58, 60 align with the second support 28 at approximately a distance L2 from the second support 28.

Figure 5E:
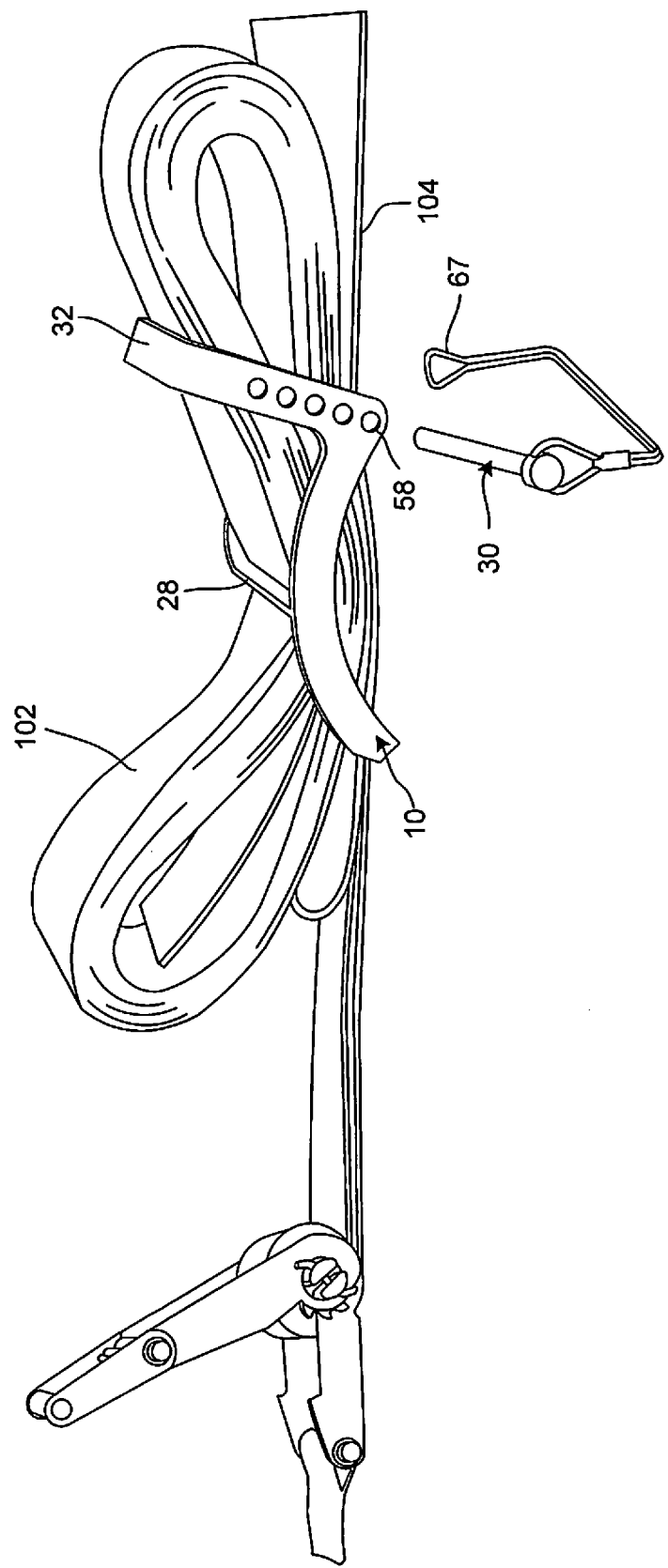

Referring to FIG. 5E, a left side view of the tie down bundle securement device 10 is depicted, according to some embodiments. The tie down bundle securement device 10 is depicted subsequent to rotation about axis 70 performed between FIGS. 4A and 4B. A third support member is depicted, for insertion through the apertures 58, 60. In embodiments, the third support member 34 is a pin for inserting through the through the pair of apertures of the plurality of apertures 58, 60, aligned with the second support 28, underneath the tensioned tie down strap 104.

Figure 5F:
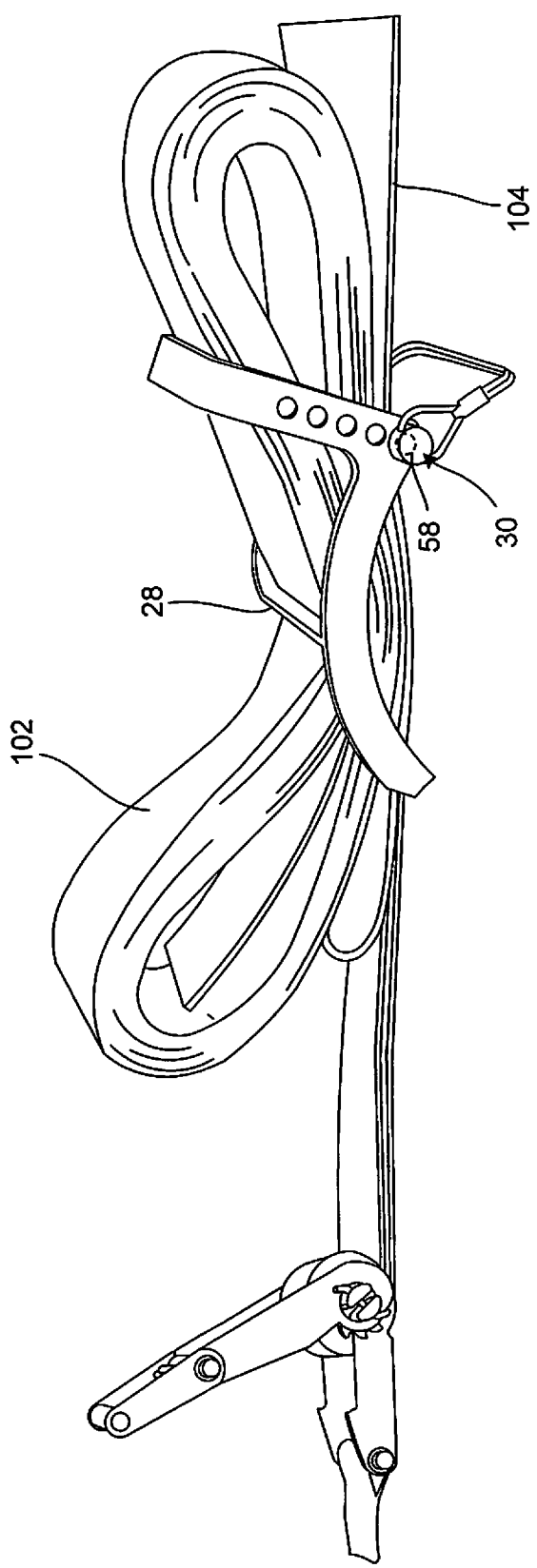

Referring to FIG. 5F a right side view of the tie down bundle securement device 10 is depicted, according to some embodiments. As seen in FIG. 5F, tie down bundle securement device 10 is depicted subsequent to FIG. 5E and insertion of the third support member 30. After insertion, the third support member 30 may be used to secure the tie down bundle securement device 10 in place, rotated about axis 70 and compressing the looped bundle 102 to the tensioned tie down strap 104.

Figure 5G:
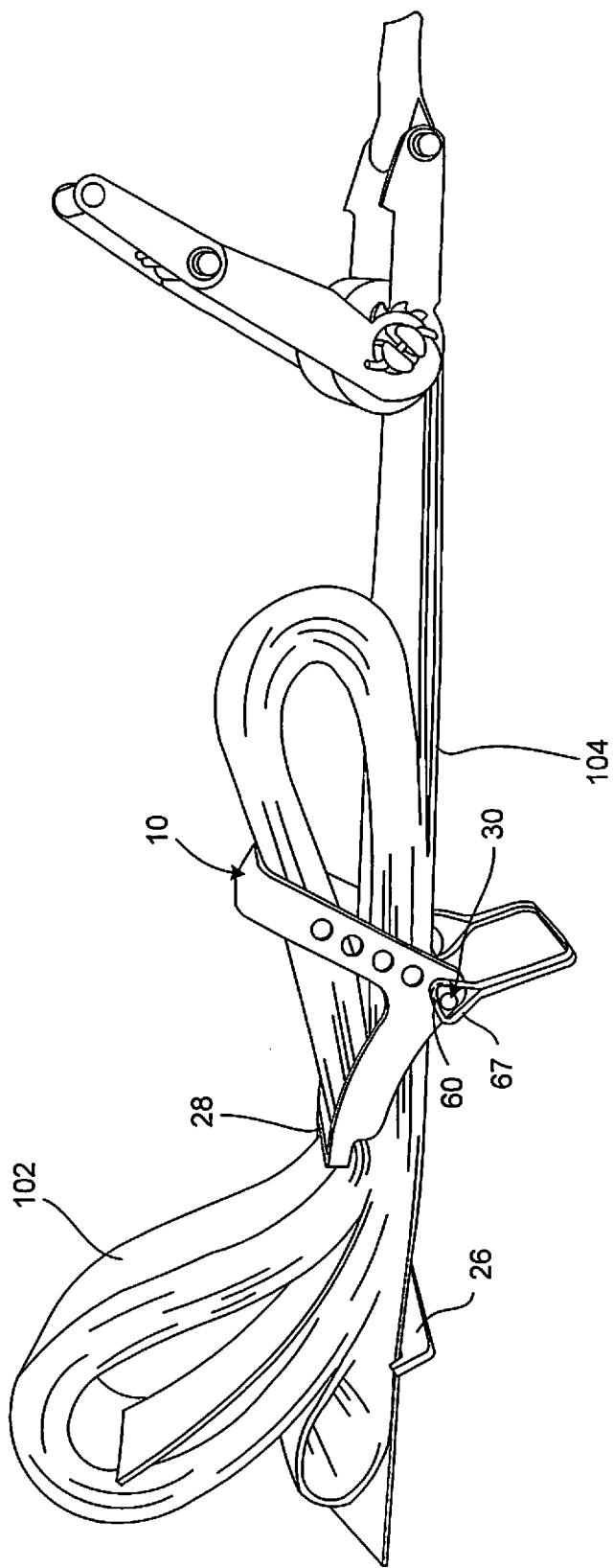

Referring to FIG. 5G, a right side view of the tie down bundle securement device 10 is depicted, according to some embodiments. As seen in FIG. 4D, tie down bundle securement device is depicted subsequent to FIG. 4C and insertion of pin 30. Clasp 67 is depicted around the third support member 30 and securing the member in place through a pair of the plurality of apertures 58, 60.

Figure 6:
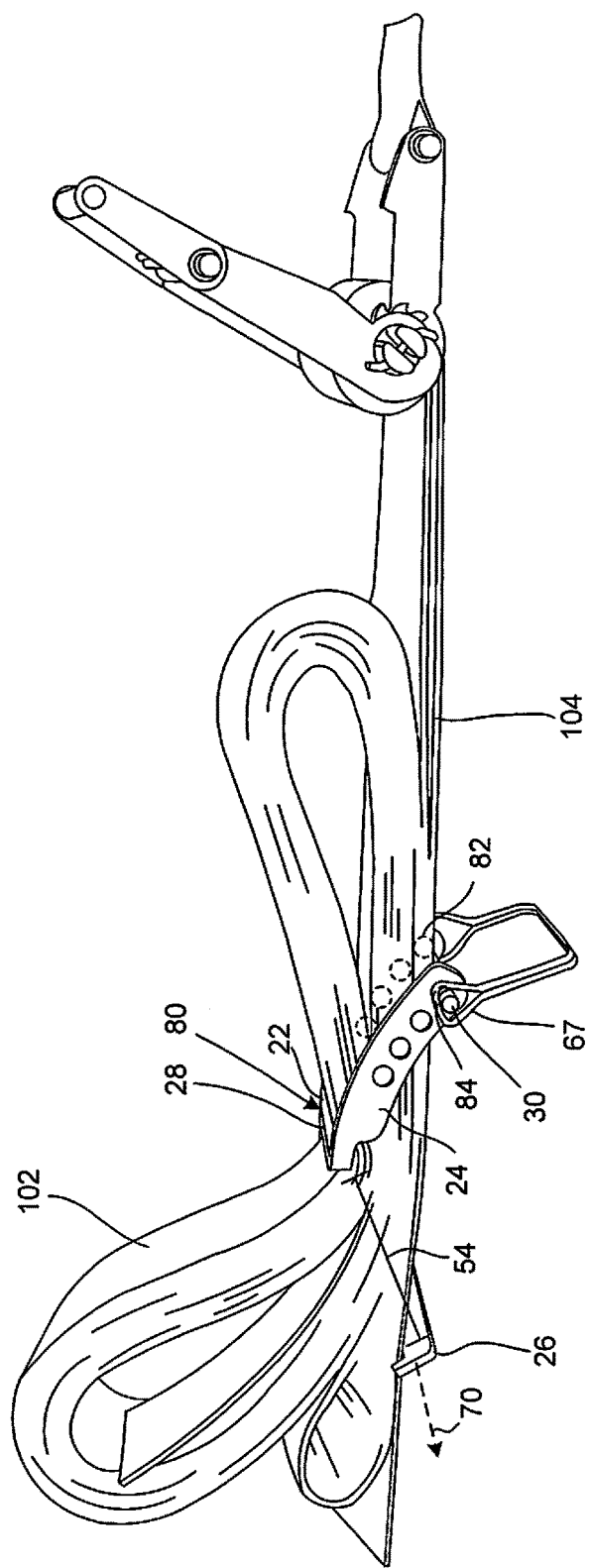
FIG. 6 depicts a perspective view of a tie down bundle securement device securing a looped bundle of tie down strap, according to one or more embodiments of the disclosure.

Referring to FIG. 6, a right side view of a tie down bundle securement device 80 securing a looped bundle of tie down strap 102 to a base 104 is depicted, according to some embodiments. The tie down bundle securement device 80 can be seen rotated about axis 70 (FIG. 3) compressing the looped bundle 102 to the tensioned tie down strap 104, received in the opening 54. As described, the first and second supports 26, 28 compress together the looped bundle 102 and the tensioned tie down strap 104 due to rotation about axis 70 through the first support member 26. A plurality of apertures 82, 84 may be included in each of the first and second frame portions 22, 24. As the tie down bundle securement device 80 is rotated, a pair of apertures may come in alignment with the first support member 26. The third support member 30 may be adjustably positioned by inserting the third support member 30 through apertures in alignment with the second support 28 to secure the position of the tie down bundle securement device 80 compressing the looped bundle 102 to the tensioned tie down strap 104.

Figure 7:
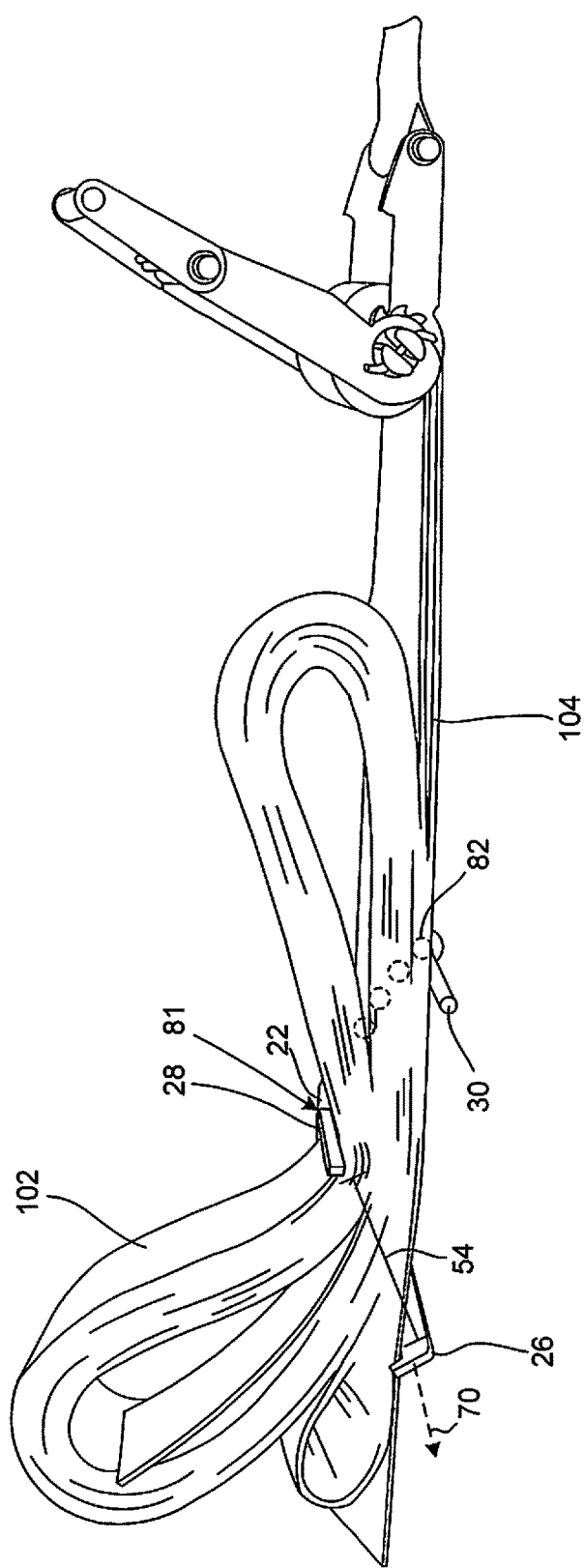
FIG. 7 depicts a perspective view of a tie down bundle securement device securing a looped bundle of tie down strap, according to one or more embodiments of the disclosure.

Referring to FIG. 7, a right side view of a tie down bundle securement device 81 securing a looped bundle of tie down strap 102 to a base 104 is depicted, according to some embodiments. The tie down bundle securement device 81 can be seen rotated about axis 70 (FIG. 3) compressing the looped bundle 102 to the tensioned tie down strap 104, received in the opening 54. As the tie down bundle securement device 81 is rotated, at least one of the plurality of apertures 82 may come in alignment with the first support member 26. The third support member 30 may then be adjustably positioned underneath the tensioned tie down strap by inserting the member through the aligned aperture to secure the position of the tie down bundle securement device 81.

Figure 8:
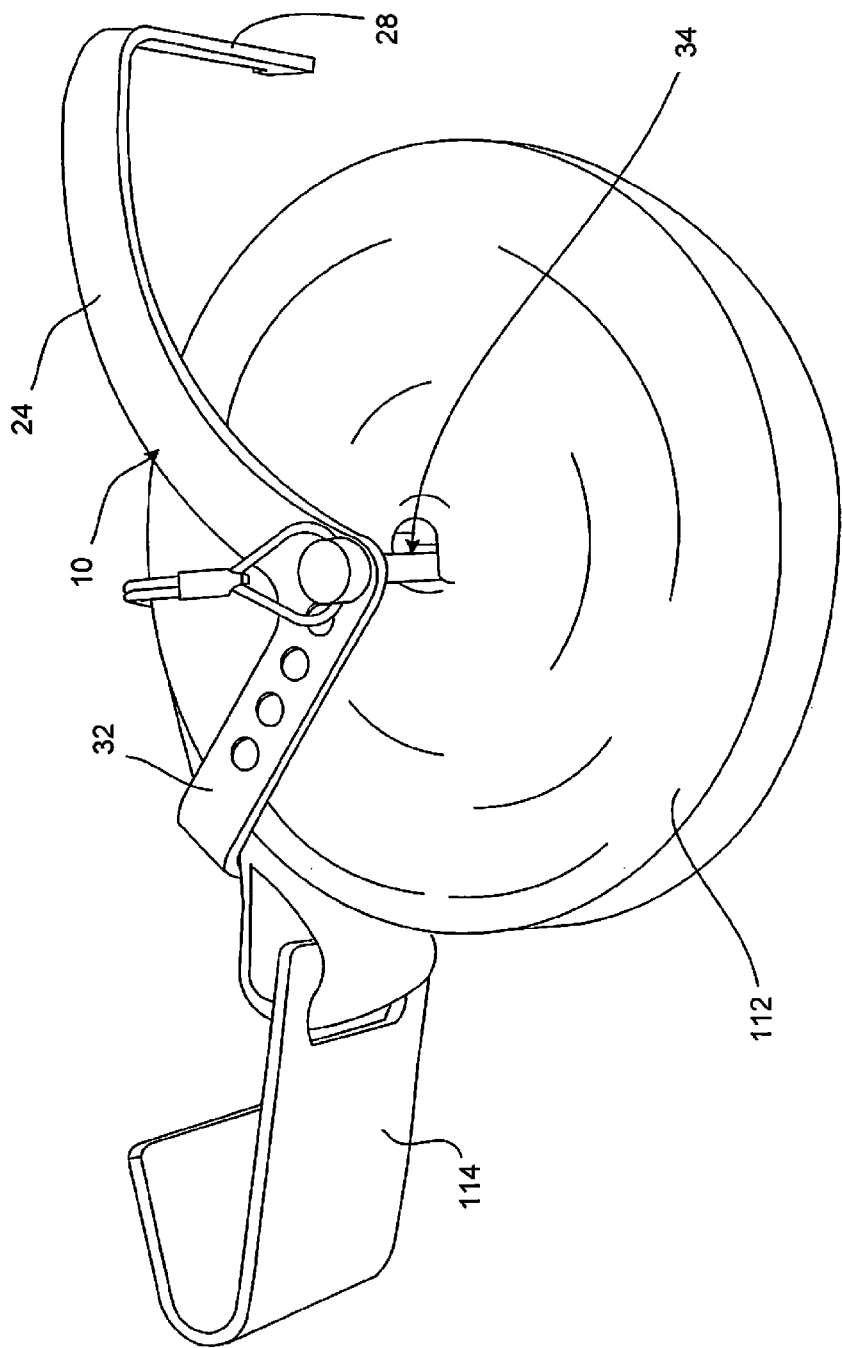
FIG. 8 depicts a tie down bundle securement device and coil of tie down strap, according to one or more embodiments of the disclosure.

Referring to FIG. 8, a tie down bundle securement device 10 and coil of tie down strap is depicted, according to one or more embodiments of the disclosure. The tie down bundle securement device 10 may be the same or substantially similar as the tie down bundle securement device 10 (FIG. 1). For example, as seen in FIG. 8, the tie down bundle securement device 10 includes a second frame portion 24, a third support member 30, and a third frame portion 33.

In one or more embodiments, the tie down bundle securement device 10 may include a coil of tie down strap wrapped around the pin 34 inserted through a pair of the plurality of apertures 122, 120. For example, seen in FIG. 8, the tie down bundle securement device 10 includes a coil of strap 112 and a clasp 114. In operation, the tie down bundle securement device 10 may be used to store the strap 112 in a coiled fashion for ease of access and eventual use. In some embodiments, the first and second supports, 26 (FIG. 1), 28 may act as a stop or break to slow or stop the uncoiling of strap 112 as the clasp 114 is pulled.

Referring to FIG. 9, a kit 160 for sealing a wafer carrier assembly is depicted. In some embodiments, the kit 160 includes a tie down bundle securement device 10 and a set of instructions 162 on a tangible medium 161. The securement device 10 may be the same or substantially similar as described as the tie down bundle securement device as described with reference to FIGS. 1 and 2.

The instructions 162 may describe securing a looped bundle of tie down strap to a tensioned tie down strap in conformity with one or more embodiments of the disclosure. For example, the tangible medium 161 may include instructions 162 to receive in an opening of the tie down bundle securement device 10 a looped bundle of tie down strap and tensioned tie down strap. The tangible medium 161 may further include instructions to rotate the securement device 10 to compress the looped bundle and the tensioned tie down strap, and to adjustably position the third support member to secure the securement device 10 in position compressing the looped bundle to the tensioned tie down strap.

The tangible medium 161 includes may include a physical document, a computer readable storage medium, or other suitable tangible medium 161. In some embodiments, the computer readable storage medium is a tangible device that retains and stores instructions for use by an instruction execution device.

In some embodiments, the computer readable storage medium includes, but is not limited to, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. In one embodiment, the computer readable storage medium includes a QR code readable using a scanner.

A tangible medium 161, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A tie down bundle securement device for attaching a looped bundle of tie down strap to a tensioned tie down strap, the device comprising:
   a first support member for placement below the tensioned tie down strap, the first support member extending normally from a first end portion of an elongated first frame portion and extending in a first direction, the first frame portion being arced about an axis substantially parallel to the first direction;
   a second support member for placement on the looped bundle, the second support member intermediate the first support member and a second end portion of the first frame portion and extending normally from the first frame portion in the first direction, the first frame portion and the first and second support members defining an opening, intermediate the first and second support members, to receive the looped bundle and the tensioned tie down strap; and
   a third support member for placement below the tensioned tie down strap, the third support member adjustably positioned on the first frame portion at the second end portion;
   wherein, when the looped bundle and the tensioned tie down strap are received in the opening, the device is rotatable about the first support member to compress the second support member into the looped bundle, and the third support member is adjustable below the tensioned tie down strap while the second support member is compressing the looped bundle to secure the looped bundle to the tensioned tie down strap.

2. The tie down bundle securement device of claim 1, wherein:
   the second support member extends normally to a first end portion of an elongated second frame portion; and
   the third support member is adjustably positioned at a second end portion of the second frame portion.

3. The tie down bundle securement device of claim 1, wherein
   the second support member extends normally from an apex of the arced first frame portion.

4. The tie down bundle securement device of claim 1, further comprising
   a plurality of apertures defined in the second end portion of the first frame portion;
   wherein the third support member is adjustably positioned on the first frame portion at the second end portion via insertion of the third support member into at least one of the plurality of apertures.

5. The tie down bundle securement device of claim 4, wherein:
   the third support member is a pin received, extending in the first direction, through one of the plurality of apertures.

6. The tie down bundle securement device of claim 1, wherein:
   the first support member includes a lip positioned at an end of the first support member distal to the first frame portion, the lip extending outwardly, normal to the first direction.

7. The tie down bundle securement device of claim 1, further comprising:
   a handle portion included in the first frame portion, the handle portion displaced from the first support member; and
   wherein the second support member is intermediate the handle portion and the first support member.

8. The tie down bundle securement device of claim 1, in combination with a tie down ratchet mechanism with a strap.

9. The tie down bundle securement device of claim 1, further comprising:
   a set of instructions on a tangible medium for using the tie down bundle securement device.

10. A tie down bundle securement device for attaching a looped bundle of tie down strap to a tensioned tie down strap, the device comprising:
    a first support member for placement below the tensioned tie down strap, the first support member extending normally from a first end portion of an elongated first frame portion and extending in a first direction;
    a handle portion included in the first frame portion, the handle portion displaced from the first support member;
    a second support member for placement on the looped bundle, the second support member intermediate the first support member and the handle portion and extending normally from the first frame portion in the first direction to a first end portion of an elongated second frame portion, substantially parallel with the first frame portion, the first frame portion and the first and second support members defining an opening, intermediate the first and second support members, to receive the looped bundle and the tensioned tie down strap;
    a third support member for placement below the tensioned tie down strap, the third support member adjustably positioned, extending between the first and second frame portions, at a second end portion of the first frame portion and at a second end portion of the second frame portion; and
    whereby, when the looped bundle and the tensioned tie down strap are received in the opening, the handle is usable to rotate the device about the first support member to compress the second support member into the looped bundle, and the third support member is adjustable below the tensioned tie down strap while the second support member is compressing the looped bundle to secure the looped bundle to the tensioned tie down strap.

11. The tie down bundle securement device of claim 10, wherein
    the first frame portion and second frame portion are arced about an axis substantially parallel to the first direction; and
    the second support member extends normally from an apex of the first frame portion to the first end portion of the second frame portion.

12. The tie down bundle securement device of claim 10, further comprising
    a first aperture defined in the second end portion of the first frame portion and a second aperture defined in the second end portion of the second frame portion;
    wherein the third support member is adjustably positioned at the second end portion of the first frame portion and at the second end portion of the second frame portion via insertion of the third support member through the first and second apertures.

13. The tie down bundle securement device of claim 12, further comprising:
    a first plurality of apertures including the first aperture are defined in the second end portion of the first frame portion and a second plurality of apertures including the second aperture are defined in the second end portion in the second frame portion.

14. The tie down bundle securement device of claim 12, wherein:

the third support member is a pin.

15. The tie down bundle securement device of claim 10, wherein:

the first support member includes a lip positioned at an end of the first support member distal to the first frame portion, the lip extending outwardly, normal to the first direction.

16. The tie down bundle securement device of claim 10, in combination with a tie down ratchet mechanism with a strap.

17. A method of securing a tie down strap, the method comprising:

receiving, in an opening of a tie down bundle securement device, a looped bundle of tie down strap positioned on a tensioned tie down strap, the looped bundle and the tensioned tie down strap extending in a first direction, the tie down bundle securement device including;

a first support member for placement below the tensioned tie down strap, the first support member extending normally from a first end portion of an elongated first frame portion;

a second support member for placement on the looped bundle, the second support member intermediate the first support member and a second end portion of the first frame portion and extending normally from the first frame portion, the first frame portion and the first and second support members defining the opening intermediate the first and second support members; and a third support member for placement below the tensioned tie down strap, the third support member adjustably positioned on the first frame portion at the second end portion;

rotating the tie down bundle securement device about the first support member to compress the second support member into the looped bundle; and adjusting, while the second support member is compressing the looped bundle, the third support member below the tensioned tie down strap, to secure the looped bundle to the tensioned tie down strap.

18. The method of claim 17, wherein receiving, in the opening of the tie down bundle securement device, the looped bundle of tie down strap positioned on the tensioned tie down strap, includes receiving the looped bundle and the tensioned tie down strap in the tie down bundle securement device including a plurality of apertures defined in the second end portion of the first frame portion.

19. The method of claim 18, wherein rotating the tie down bundle securement device about the first support member includes aligning the at least one aperture of the plurality of apertures with the first support member.

20. The method of claim 17, wherein:

the looped bundle of tie down strap is a first portion of a strap extending loose from a ratchet, and the tensioned tie down strap is a ratcheted second portion of the strap.

* * * * *